Sept. 20, 1966  B. H. LEONARD, JR  3,274,064
ACTIVATION ANALYSIS NUCLEAR REACTOR AND SPOOL-LIKE
FUEL ELEMENT THEREFOR
Filed Oct. 24, 1960  5 Sheets-Sheet 1

*INVENTOR.*
BYRON H. LEONARD JR.
BY
*Sutherland Polster & Taylor*
ATTORNEYS

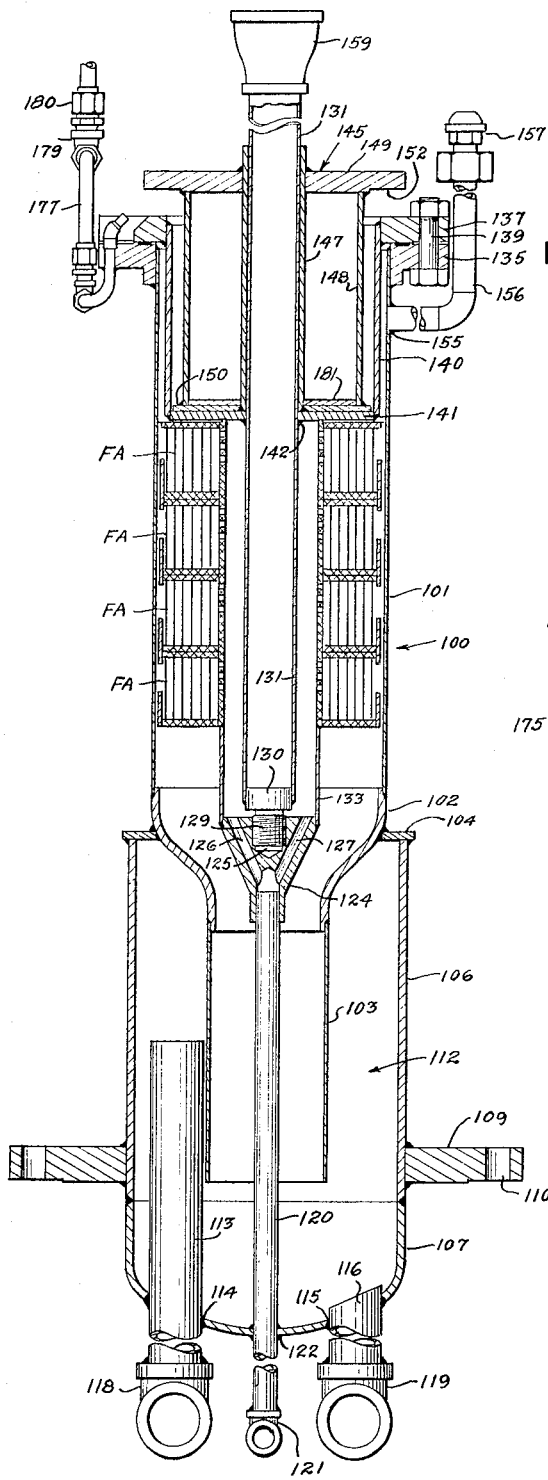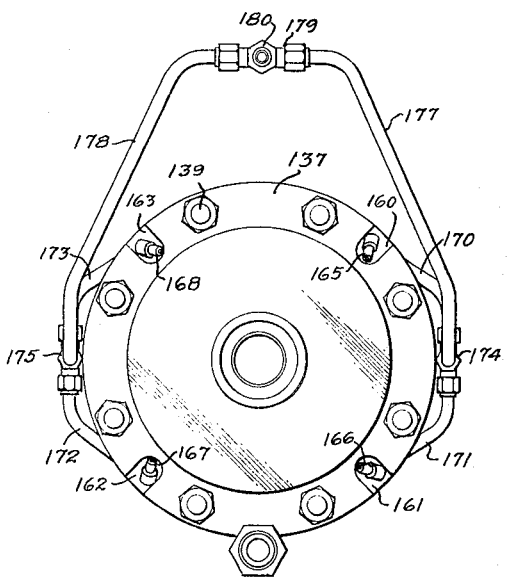
FIG. 3.
FIG. 4.
INVENTOR.
BYRON H. LEONARD JR.
BY
Sutherland, Polster & Taylor
ATTORNEYS Sept. 20, 1966　　　B. H. LEONARD, JR　　　3,274,064
ACTIVATION ANALYSIS NUCLEAR REACTOR AND SPOOL-LIKE
FUEL ELEMENT THEREFOR
Filed Oct. 24, 1960　　　　　　　　　　　5 Sheets-Sheet 3

*INVENTOR.*
BYRON H. LEONARD JR.
BY
Sutherland, Polster & Taylor
ATTORNEYS

Sept. 20, 1966　　B. H. LEONARD, JR　　3,274,064
ACTIVATION ANALYSIS NUCLEAR REACTOR AND SPOOL-LIKE
FUEL ELEMENT THEREFOR
Filed Oct. 24, 1960　　　　　　　　　　5 Sheets-Sheet 4

*INVENTOR.*
BYRON H. LEONARD JR.
BY
Sutherland, Polster & Taylor
ATTORNEYS

INVENTOR.
BYRON H. LEONARD JR.
BY
Sutherland, Polster & Taylor
ATTORNEYS 3,274,064
ACTIVATION ANALYSIS NUCLEAR REACTOR
AND SPOOL-LIKE FUEL ELEMENT THEREFOR
Byron H. Leonard, Jr., Ladue, Mo., assignor to Internuclear Company, Clayton, Mo., a corporation of Missouri
Filed Oct. 24, 1960, Ser. No. 64,438
26 Claims. (Cl. 176—20)

This invention relates to nuclear reactors and more specifically to an inexpensive construction for a nuclear reactor primarily intended for activation analysis of sample quantities which reactor can be constructed at a cost competitive with other machines which are used for this purpose, such as particle accelerators and particle generators. At the present time, the latter types of machine mentioned may be constructed at a small fraction of the cost of a typical research reactor. A small inexpensive nuclear reactor constructed in accordance with this invention is primarily intended for analysis of small samples. The analysis may be of individual samples or may be for continuous monitoring of a very small stream of a sample fluid or semi-fluid material, but its most important application lies in the field of qualitative and/or quantitative analysis to determine the parts per million (<p.p.m.) of impurities in microgram or macrogram (millionths of a gram or larger) quantities. This machine, therefore, is applicable to basic research, medical research, pure chemical production, ceramics (semiconductors), for example. It is well known that almost every element which is found in trace quantities in materials can be determined by activation analysis. Some of these elements are listed in Geneva Paper P–927. Briefly, the methods of analysis may be classified as non-destructive and destructive, depending on the pressure of interfering elements. In the former, an irradiated sample is measured directly to determine the kind and amount of emission generally with a scintillation probe and a multichannel analyzer. A number of elements in the same channel can then be determined quantitatively from the radiation intensity and energy level detected. If the energy level detected from two or more isotopes is approximately the same, partial or complete chemical separation can be resorted to. Often unirradiated carrier elements are added to improve separation. In order to illustrate the utility of this form of analysis, certain specific examples are listed below as types of quantitative analysis. These are:

(1) Determination of Ca, Na and/or lithium in 0.01–1 p.p.m. in various materials.
(2) Determination of Na in blood samples.
(3) Quality control in semi-conductors by analyzing for Ar and Cu in Si to $10^{-7}$ parts.
(4) Determination of $H_f$ in zirconium and Co in steel.
(5) Determination of $H_f^{176}$ in radiogenic materials.

Obviously, a machine constructed in accordance with this invention can produce isotopes, as such, in small quantities, particularly relatively short-lived isotopes, in a cheap and convenient manner.

A machine, according to this invention, could be used also as above mentioned to control certain processes in manufacture by diverting a proportional quantity in a very small side stream through the machine for irradiation and subsequent monitoring for any particular element. A side stream from a distillation column might be monitored for $N^{16}$ to determine the amount of oxygen (perhaps as $H_2O$) present.

From what has been stated so far, it will be readily understood that a small inexpensive nuclear reactor is a machine with an extended field of economic utility. This invention is one directed at the simplification of constructional features in a nuclear reactor so as to reduce its cost and extend its utility into fields of application heretofore economically regarded as prohibited.

The nuclear reactor, according to the present invention and here referred to for purposes of convenience as the (AAR), is a construction adapted for prefabrication and for subsequent installation requiring only water and electric supply connection to operate the unit. The complete facility consists of three major components, the reactor package, the instrumentation package, and, of course, the biological shield. Of these three components, the reactor and the instrument packages are completely shop fabricated and adapted to be connected together at the location for the reactor site by means of a multistrand cable connector. The necessary water connection will appear as this description proceeds. Since this invention is primarily in the reactor construction, this description will be limited to the reactor package, it being understood that the instrument package is constructed of readily obtainable standard units. The biological shield will be described here only with reference to the installation of the reactor package. By reactor package is meant the pressure vessel, structural steel, core tank and core reflector, piping and valves, heat exchanger, pump, ion exchanger, regulating system, and scram system. From the mechanical standpoint, the reactor package according to this invention includes a pressure tank supported in a structural steel mounting, which tank contains a small core tank surrounded by a reflector. The core tank is especially constructed for the purpose heretofore mentioned with fuel elements or assemblies so constructed and enclosed and arranged therein as to provide a suitable flux trap. The fuel assemblies surround an exposure chamber in spaced relation which is located within the core tank, and the system therein is so interconnected as to form an individual sump within the core tank. A circulation system is provided to demineralize the water circulated and remove excess heat. And the piping system in the circulation system is so interconnected as to provide for circulation of the moderator within the fuel assemblies to maintain them submerged under normal operating conditions, but at the same time to provide a water trap in the core tank within the sump. This trap is big enough to accommodate all of the moderator surrounding the fuel assemblies providing for rapid purging under scram conditions. The circulation system has interconnected pipes, fittings and pumps, etc. primarily useful in maintaining circulation through the pressure vessel, but is secondarily employed for regulation and emergency shut down. One of the features of the circulation system is an independent circuit connected with the core tank utilizing the head of moderator in the pressure vessel to provide independent circulation through the core tank.

The mechanical construction is also designed, as will be hereinafter pointed out, to utilize standard equipment, for example, all of the piping outside the pressure vessel is of aluminum and has standard aluminum screwed fittings except at the circulation pump joints which are flange fittings. All valves are brass or aluminum and are standard globe except certain control valves which will be hereinafter described. The circulation pump is a standard off the shelf item constructed of bronze and of the centrifugal type. The ion exchanger is a standard off the shelf item and may be either purchased outright or leased.

As can be seen from the above brief description, it is one of the objects of this invention to provide an inexpensive activation analysis reactor (AAR), the mechanical construction of which lends itself to standard shop practices of fabrication.

It is another object of the invention to provide a flux trap type reactor capable of operating at 10 kw. to produce a maximum unperturbed thermal neutron flux of $10^{12}$ N/cm.$^2$/sec. in a test hole, wherein the epi-thermal neutron flux is approximately equal to the thermal neutron flux.

It is a further object of the invention to provide a mechanical construction for a nuclear reactor which has separate packages capable of prefabrication and simple installation.

It is still another object of this invention to provide a nuclear reactor with simplified controls for regulation and safety.

It is still another object of this invention to provide a nuclear reactor with a construction wherein units and systems are combined to serve multi-purposes and are so arranged as to fail safe.

It is still another object of this invention to provide a mechanical construction for a nuclear reactor and the fuel assemblies therein to arrive at combined safety features and efficient operation in manners and in ways not heretofore contemplated.

The following is a detailed description in such full, clear, concise and exact terms as will enable one skilled in the art, to which this invention relates, to make, construct and use the same when this description is taken in conjunction with the accompanying drawings in which:

FIG. 3 is a vertical section taken through the core tank with fuel assemblies installed;

FIG. 4 is a top view of the core tank shown in FIG. 3;

In the following detailed description, certain dimensions and sizes deemed appropriate for the several parts in the mechanical construction of the nuclear reactor will be given, but it should be understood these dimensions are merely given for puropses of illustration and should not be taken as restrictive. Such dimensions, when given, are merely for the purpose of illustrating the proportional relationship.

Figure 2:
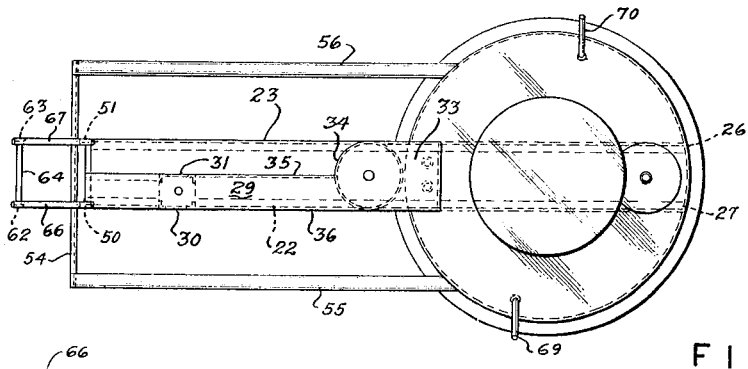
FIG. 2 is a top view of the structure shown in FIG. 1.
Figure 1:
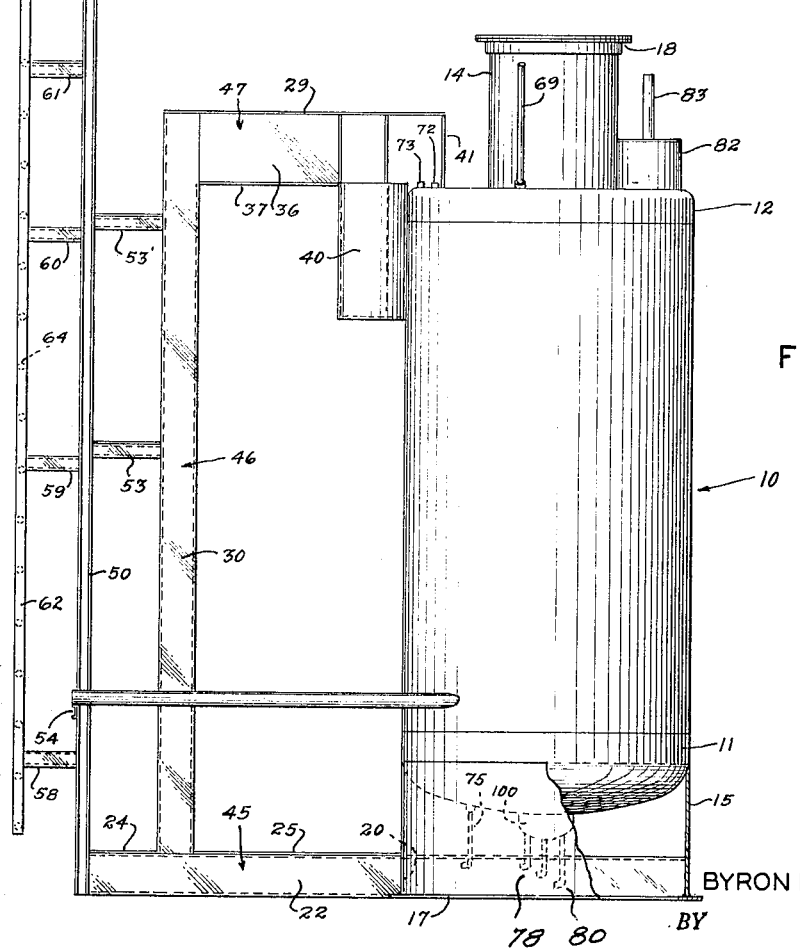
FIG. 1 is a side elevational view of the reactor package as prefabricated in the shop and ready for installation.

Turning now to a consideration of FIGS. 1 and 2, the reactor package as has been stated includes prefabricated units, and these figures illustrate one of the units. One of the principal parts is a pressure vessel 10 made with a cylindrical body with an inside diameter of about five feet six inches, to which cylindrical body is welded a lower head 11 and an upper head 12. The upper head 12 is substantially flat on top and has an aperture in which is welded a cylindrical extension to form a shield plug housing 14. Surrounding the bottom ellipsoidal head 11 is welded a cylindrical skirt 15 surrounded by a ring-like flange 17 integrally welded thereto to form a pedestal support for the pressure vessel 10. Shield plug housing 14 also has a surrounding flange at its upper edge 18 forming a support for a flange integral with the top of a shield plug which telescopes within the housing. It is proposed to manufacture or prefabricate the tank 10 of ⅜ carbon steel with welded construction and a special coating for corrosion resistance. The heads welded on the ends of the tank are either ⅜ or ½ inch steel, as the case may be, of the same specification. On the other hand, the plug housing is a 30 inch section of 20 inch pipe projecting inside the tank at its lower end and welded to the aperture in the upper tank head 12. Thus, the overall dimension from the bottom of the pedestal skirt to the upper flange 18 is under 17 feet. The pedestal skirt 15 is apertured at one side at 20, and through this aperture project a pair of channel members 22 and 23 secured at the aperture and at their ends 26 and 27 to the opposite wall of the pedestal support. The channel members 22 and 23 are arranged with their flanges facing one another, and the upper flanges of the channels 22 and 23 have welded thereto a pair of plates 24 and 25. These plates brace the channel members 22 and 23 and form a unitary outboard support for the pressure vessel 10. The enclosed passageway or housing 45 formed by the channels 22 and 23 is utilized to provide access to, and an enclosure for, the necessary piping extending to and from the pressure vessel, which piping will be hereinafter described. Between the plates 24 and 25 are arranged a pair of vertically mounted channel irons 30 and 31, which are welded to the upper flanges of the channels 22 and 23, and extend vertically therefrom so as to form a structural member and also a housing 46 for piping and other control items for the nuclear reactor. At the upper ends, the channels 30, 31 are connected by a plate 29 which is welded to their upper ends and extends towards the pressure vessel. Plate 29 has an irregular shape as will be seen in FIG. 2, its inboard end, such as 33, being twice the width of the portion 29 and connected thereto by a generally arcuate portion 34. Side and bottom plates, such as 35, 36 and 37, respectively, form an enclosed housing 47 extending laterally from the housing 46 between the structural members 30 and 31 so as to connect with an open type tank 40 which is a cylindrical housing welded to the side of the pressure vessel 10. An end plate 41 closes the inner open end formed by the plates 29, 33, 35, 36 and 37. The structure, just described, forms a series of interconnected housings, generally indicated as 45, 46 and 47.

At the open end of the housing 45 are a pair of vertical rails formed by channels 50 and 51. Rails 50 and 51 in turn are connected to the vertical structural elements 30 and 31 by spaced pairs of channels 53 and 53' welded at opposite ends to the channel 30 and the vertical rails 50 and 51. A channel member 54 is welded to the front face of vertical rails 50 and 51 and extends transversely thereof. Transverse structural element 54 forms a support for an instrument tube 55 and an instrument tube 56, the ends of which tubes are supported on and attached to the transverse member 54. Each tube 55 and 56 extends inwardly through the wall of the pressure vessel 10, and each terminates adjacent the opposite wall thereof. A series of pairs of spaced channels, indicated as 58, 59, 60 and 61 are welded to the rails 50, 51 and connect at their outer ends to a pair of vertical supports 62 and 63 for a series of ladder rungs extending transversely therebetween, such as 64. At the upper end of supports 62 and 63 and rails 50 and 51 are handrails 66 and 67. The instrument tubes 55 and 56 are laterally braced by the structural support heretofore described and are closed at their inner ends. Two other exposure tubes, such as 69 and 70, extend downwardly from and through the head 12 of the pressure vessel 10 on a diagonal to a point adjacent the core. The upper head 12 is provided with suitable passages, such as indicated at 72 and 73, which will accommodate a supply pipe for water to fill the pressure vessel 10 and provide for a scram line pipe to the core tank, respectively. The bottom of head 11 has an outlet pipe 75 connected with the pressure vessel and extending into the housing 45. The lower end of the core tank 100 has pipe connections 78 and 80 also projecting into the channel 45. The upper head 12 of the pressure tank supports a valve box, generally indicated as 82, with a tubular extension 83 for a valve stem. The box 82 is made out of sections welded together and secured to the head 12.

The structure, which has just been described, is one of the units which can be prefabricated in the shop of ordinary structural steel shapes. The pressure vessel and its auxiliary supporting members extending therefrom and welded thereto all form a part of the structural support for the pressure vessel and also housings for the equipment connected therewith. The structural members connected with the pressure tank 10 are all designed so as to permit the use of and provide support for the concrete blocks which will surround it and form the biological shield, hereinafter described.

Another prefabricated portion of the reactor package is the core tank, which is illustrated in section in FIG. 3. The core tank is constructed of pipe sections of standard thickness and of stainless steel welded together. Thus, in FIG. 3 is shown a tubular core retaining section 101 to which is welded a reducer section 102. The core section is of 10 inch pipe and reducer 102 has welded to its lower end a section of 5 inch pipe 103 forming an outlet from the core tank. Around the periphery of the reducer 102 is a ring 104 also of stainless steel welded to the reducer, and ring 104 in turn has a piece of 12 inch pipe 106 welded to the ring 104 at its upper end. At the lower end is a prefabricated head 107 welded to the end of the pipe 106 and forming a closed end thereon. About the periphery of the pipe 106 is a flange 109 provided with bolt holes 110 suitably spaced for mounting the core tank in the bottom head of the pressure vessel. Head 107 and pipe 106 form a sump 112 which encloses a stand pipe 113 welded in an aperture 114 in the head 107. Head 107 also has an aperture 115 in which is welded an outlet pipe 116. Both pipes 114 and 116 have suitable fittings thereon, such as 118 and 119, respectively. The coolant supply pipe 120 has a suitable fitting 121 on its lower end and is welded in an aperture 122 in the head 107 and extends upwardly to a Y fitting 124 which has a central socket 125 and divergent passages 126 and 127. Socket 125 carries the reduced end 129 of a plug end fitting 130 welded in the lower end of the exposure tube 131. Concentric with the exposure tube 131 and welded to the outer periphery of the fitting 124 is a core support cylinder 133 upon which the superimposed fuel assemblies, hereinafter described, are supported.

The upper end of tube 101 forming the cylinder for the core is surrounded by a flange 135 welded to the periphery of the tube 101. Flange 135 forms a support for a closure for the core tank 100, and this closure has a cooperating flange 137 secured to flange 135 by the bolts 139 spaced about its periphery and connecting the two flanges 135, 137. The inner periphery of the flange 137 is in turn welded to the outer periphery of a tube 140 extending downward into the core tank 100 adjacent the fuel assemblies. Tube 140 has its lower end closed by a flange 141, which has its outer periphery welded to the lower end of the tube 140 and is centrally apertured to receive the exposure tube 131 which is welded at its outer periphery into the aperture 142 of the lower flange 141. Thus, the closure for the core tank comprising the elements 137, 140, 141, etc., is a unit with the exposure tube 131, and the exposure tube in turn carries the fuel assemblies FA held thereon by the threaded connection 129 with fitting 124. The sleeve 133 on fitting 124 abuts the lower fuel assembly and has a slip fit with pipe 120 so that these elements when assembled may be inserted and removed together.

Telescoped over the exposure tube 131 and within the closure 140 is a rotatable regulator, generally indicated as 145. The rotatable regulator 145 has inner and outer cylindrical walls formed by coaxially arranged pipe sections, the inner one of which is indicated as 147 and the outer 148. Upper and lower ends of these pipe sections are closed by suitable flanges, such as 149 and 150. The flanges are suitably welded to make the rotatable regulator 145 an air tight, water tight annular chamber. Flange 149 projects outwardly beyond the 8 inch pipe section forming the outer wall 148, as indicated at 152, and this outboard edge on the flange 149 extends over the flange 137 in spaced relation therewith. The upper side wall of the core tank 100 is apertured at 155 to receive a scram tube 156 having a union 157 for connection with a scram line intended for the purpose of draining the core tank 100 into the sump 112. The upper end of the exposure tube 131 also carries a fitting 159 which is flared outwardly, as shown, so as to register with an access tube, hereinafter described. Tube 260 is an auxiliary exposure tube for fluid.

Flanges 135 and 137 on the core tank and the core tank cover, respectively, are slotted inwardly from their periphery, as shown at 160, 161, 162 and 163, respectively, and suitably welded in each of these slots are nozzles 165, 166, 167 and 168, respectively. The connecting tubes for each of the nozzles, indicated as 170, 171, 172 and 173, respectively, connect with T fittings 174 and 175 which in turn are connected by tubes 177 and 178 with a T fitting 179 having a union 180. Water pumped to a pipe connected to union 180 flows from the jets 165, 166, 167 and 168 to impinge upon the under surface of the flange 152 of the rotatable regulator 145. Within the regulator 145 is a plate 181 of boron stainless steel about a quarter of an inch thick and fastened to the bottom flange 150. The water issuing from the jets 165, etc., may be controlled externally of the reactor mechine so as to determine the location of the rotatable regulator 145. This is accomplished by adjusting the weight of the rotatable regulator with respect to its displacement so that it will have a slightly negative buoyancy. The velocity from the jets 165, etc., will then determine the position of the rotatable regulator within the enclosure 140 and the proximity of the boron plate 181 with respect to the fuel assemblies. Thus, the rotatable regulator acts as a shim or control rod in the core tank 100. It should be observed that the jets issuing from the nozzles 165, etc., will have a tangential component tending to create a swirling fluid motion to spin the rotatable regulator 145 so as to impart stability thereto as well as control its vertical position. FIG. 4 illustrates the tangential arrangement of the jets in this respect.

Figure 6:
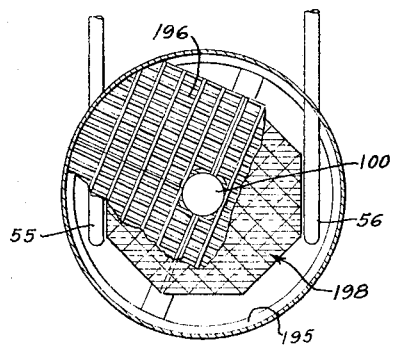
FIG. 6 is a horizontal section taken on the line 6—6 of FIG. 5 in the direction of the arrows.
Figure 5:
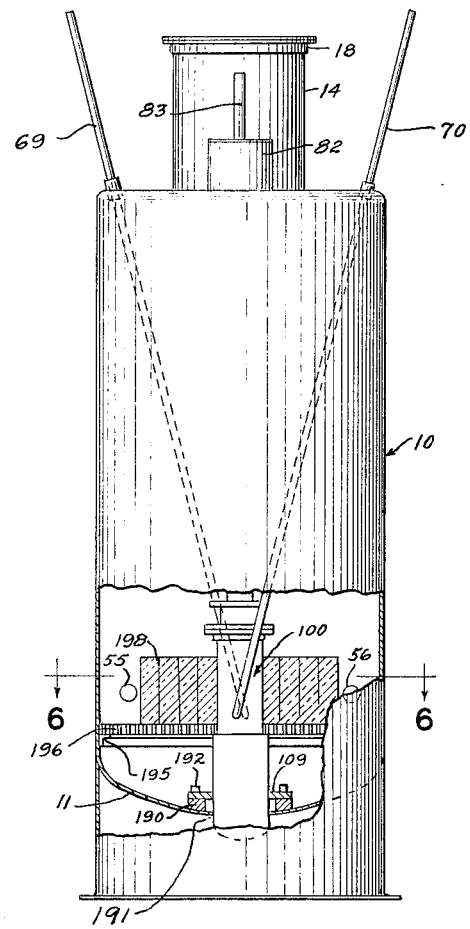
FIG. 5 is a front elevational view of the reactor package with parts broken away to show internal structure.

Referring now to FIGS. 5 and 6, the core tank 100 is mounted in the bottom of the pressure vessel 10 on a flange 190 welded to the periphery of an aperture 191 in the bottom head of the pressure vessel. Flange 109 is connected to the flange 190 by a plurality of bolts 192 about its periphery and extending through the spaced holes 110 in the flange 109. At the upper edge adjacent the upper periphery of the head 11 is secured a ring of angle iron 195, and this in turn supports a welded open steel grating 196, as shown in FIG. 6. Also indicated therein are the inner ends of the instrument tubes. The welded open steel grating 196 supported on the upper flange of the angle iron ring 195 supports the reflector, generally indicated as 198. This reflector is made up of 4½ inch by 4½ inch by 20 inch nuclear graphite columns arranged to form an octangular shape around the core tank. The columns of graphite may be anchored to the grid and may be secured in position by stainless steel straps about their outer periphery holding them together in a group about the core tank. The instrument tubes, heretofore mentioned, are also illustrated in FIG. 5, and both tubes extend downwardly in an inclined manner from the upper head 12 to a lower position alongside of the core tank 100 within the reflector 198. As shown, the core tank 100 projects upwardly through an aperture in the welded open steel grating 196 and between the ends of the sample tubes 69 and 70.

Figure 8:
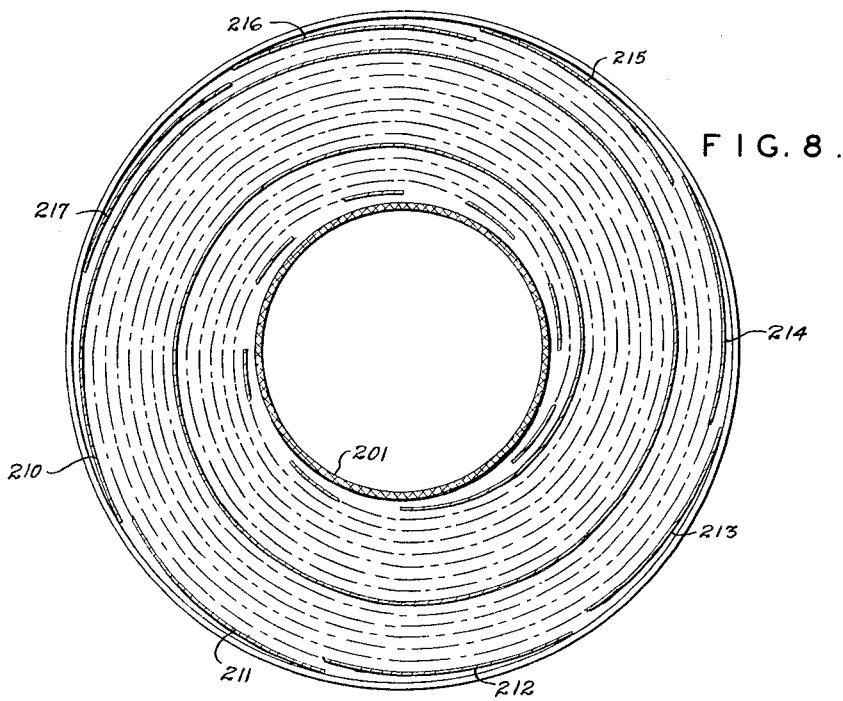
FIG. 8 is a view taken along the line 8—8 of FIG. 7.
Figure 7:
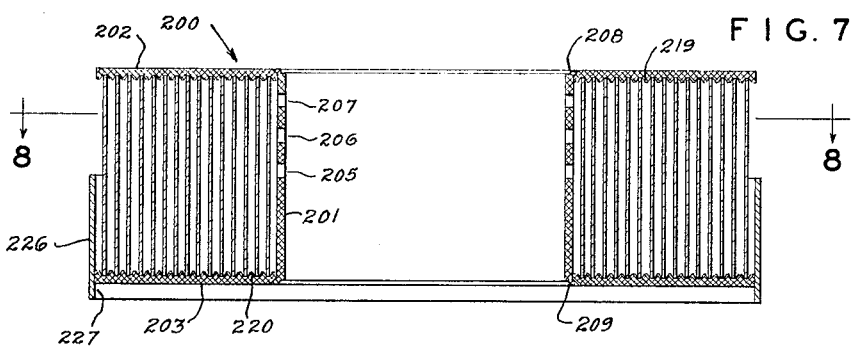
FIG. 7 is a vertical sectional view of a spool type of fuel element shown in FIG. 3 but on an enlarged scale.
Figure 9:
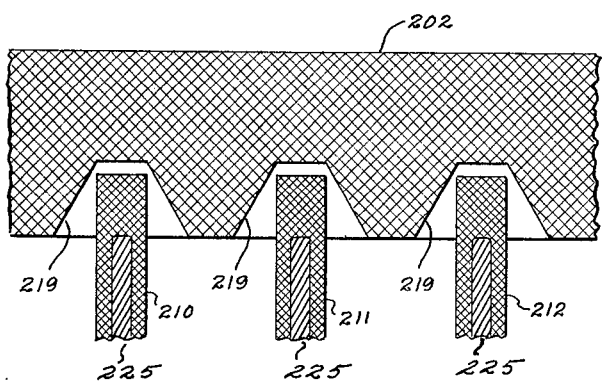
FIG. 9 is an enlarged fragmentary view in section illustrating the construction of the fuel elements shown in FIG. 7.
Figure 11:
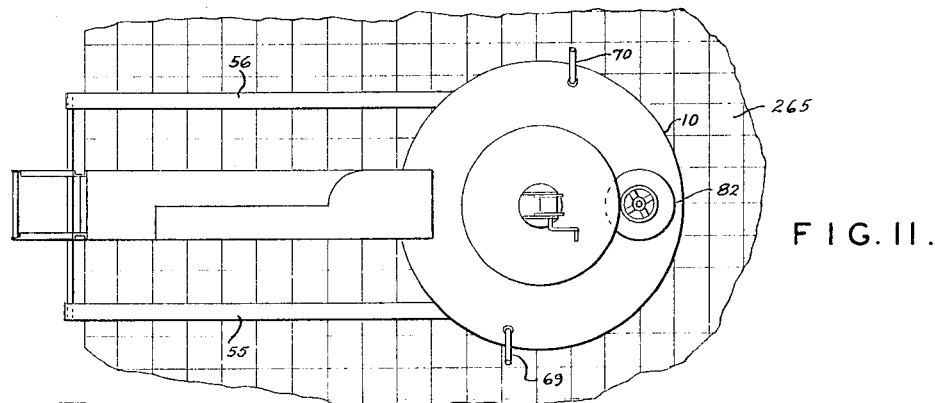
FIG. 11 is a top plan view of the structure in FIG. 10.

The fuel assemblies for use in the core tank, and indicated therein by the reference character FA, are constructed as shown in FIGS. 7, 8 and 9. Each fuel assembly, indicated generally as 200 in FIG. 7, is spool shaped with a tubular hub 201 to which is attached circular top and bottom annular flanges or spacers 202 and 203 which may be flat or concave or convex. Hub 201 is apertured about its periphery to form flow passages 205, 206 and 207. Spacers 202 and 203 are held at their inner periphery at the ends of the hub 201 by pressing mitered edges 208 and 209 onto beveled edges formed at the edge of the inner periphery of flanges 202 and 203, respectively, so that parts 202, 203 are connected to part 201 at its opposite ends to form the spool. Each spool has eight fuel bearing plates of 50 mil thickness, indicated as 210, 211, 212, 213, 214, 215, 216 and 217, which are threaded into spiral grooves, such as 219, 220, in the upper and lower radial faces of the circular plates 202 and 203, respectively. The spacers or plates of the spool are made of aluminum plate and the grooves are machined on a lathe. For example, as shown in FIG. 9, the grooves 219 are machined with a formed cutting tool using a rapid cross feed. By indexing the flanges 202 and 203 at 45 degree intervals, eight threads are formed in the radial face of each flange or spacer. Opposite pairs of threads in turn receive the opposite edges of the plates 210, 211, 212, etc., and each of the plates bears a charge of U-235, such as 225. Hub 201 can be made of a short length of 4 inch N.P.S. pipe. A retaining ring 226 is slipped over the top flange of the spool and fastened to the lower flange so as to project slightly below the lower flange of the spool as at 227. When the spools forming the fuel assemblies 200 are stacked, one on top of the other, the portion of the flange 227 forms a friction fit with the next succeeding lower fuel assembly by sliding over the outer periphery of the flange 202. The retaining ring 226 and the hub or cylindrical portion 201 of the spool form between them a reservoir which maintains coolant in the fuel assembly for decay heat removal following a scram. During operation of the reactor, the moderator is circulated upwardly around the tube 131. The moderator fills the space around the exposure tube 131 due to the fact that the tank 100 is initially filled to the top. This level is normally maintained after valve 251 is closed, as will be later pointed out. An island of moderator surrounds the exposure tube or test hole within the flux trap formed by the fuel elements. The rate of circulation of the moderator over the fuel elements FA depends upon the rate of flow through pipe 120 and passages 126 and 127 to the space around the tube 131 and the tubular hubs 201 of the fuel elements FA. The moderator from this island flows through holes 205, 206 and 207 and then spirally between the fuel plates and over the upper edge of ring 226. The overall construction of the fuel assemblies FA is such that steam formation immediately expels the moderator thereby shutting down the reactor. The moderator, however, will remain at a level slightly below the upper edge of the weir formed by retaining ring 226 and below the lowest flow passage 205. However, sufficient voids are formed due to the steam to slow down the reaction below critical even though some moderator remains in the fuel assemblies for the purpose above mentioned.

The prefabricated units above described without the fuel assemblies are preferably assembled before shipping or installation. When the units are assembled, core tank 100 is lowered into the pressure vessel until flange 109 seats on flange 190. Usually a lead gasket is placed between the flanges 190 and 109, and then the studs 102 are inserted and made up so as to anchor the core tank in place within the pressure vessel 10. Scram line 221 is then connected with the union 157 and the upper end of the scram line 221 is connected with two solenoid operated scram valves 222 and 223 and a manual fill valve 224 all located within the valve housing 82. The manual fill valve 224 has an elongated stem 225 projecting through tubular extension 83 to connect with a hand wheel 226. The scram valves are electrically operated from the instrument package.

Union 180 is connected to a tube 229 which supplies nozzles 165, etc., and connects with pipe 230 in the primary cooling loop. There is a control valve 232 which is remotely operated from the instrumentation package in the line 230. In tank housing 40 is an ion exchanger 235 with its outlet connected to the line 230 and its inlet connected to a line 236 which extends to the water main and is controlled by a manual valve 237, the primary coolant loop also includes a pump 238 connected with the line 236, this is an all bronze centrifugal type with a mechanical seal and is a standard off-the-shelf item. The pump 238 is regulated by the instrumentation connected with the nuclear reactor. The primary coolant loop also contains a fin tube heat exchanger 239 connnected by the pipe 240 with pump 238 and by pipe 241 with the sump 112 of the core tank 100. Pipe 241 connects with the fitting 119, as shown in FIG. 3. The fin tube heat exchanger 239, has a coolant circuit connected thereto by way of the inlet pipe 243 and the discharge pipe 244.

The secondary coolant loop has a pipe 246 conneccted with the outlet pipe 75 from the pressure vessel 10. Pipe 246 contains a control valve 248 which controls the flow from the pressure vessel 10 through the secondary coolant loop, including the pipe 249 connected with the fitting 121, pipe 120, fitting 124, to the fuel assemblies FA and return through pipe 103 to the bottom of the core tank sump 112. The secondary coolant loop also includes return lines 253 and 241 back to the pump 238 and an indicator line 250 with a core tank level indicator valve 251 located at a level approximately at the top of the reactor core tank 100. Line 250 is connected to line 249 and thus indicates water level in core tank 100.

The primary coolant loop also has a dump line 253 with an outlet controlled by an emergency dump valve 255. The sump 112 of the reactor core tank 100 has a standpipe 113 and a fitting 118 at the bottom of the standpipe external of the core tank connected by a line 257 with an overflow valve 258.

The nuclear reactor is provided with an access tube 262 mounted in the lead plug 263 and provided with the flared end 264 aligned with the flared end 159 on the exposure tube 131. Within the plug 263 is a rotary shield plug 265 of conventional construction which provides access to the sample holding coffin 267, schematically shown. The rotary plug 265 can be turned so that a sample within the coffin can be lowered within the core through the access tube 262 into the exposure tube 131. Instrument tubes, shown in FIG. 5, are inserted, and the reactor package is now completely assembled and ready for the installation of the biological shield. The shield is a plurality of concrete blocks or the like 265 arranged around the pressure vessel 10 and around the housings 45, 46 and 47 containing the plumbing connections.

Figure 10:
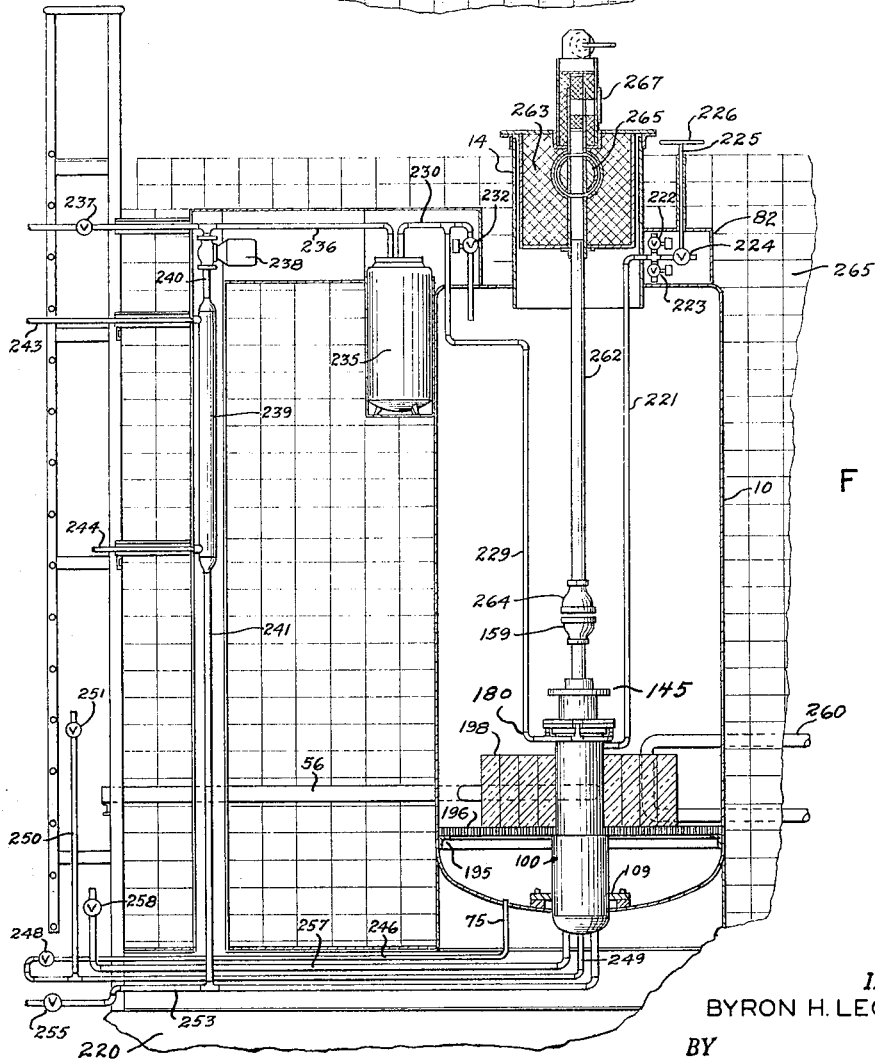
FIG. 10 is a vertical sectional view of the reactor package in an operating environment.

The reactor pressure vessel and the structural steel assembled therewith, as heretofore described and shown in FIG. 1, is placed in an upright position on a suitable base, such as 220 shown in FIG. 10. In order to save overall height, it is perfectly possible to make a pit installation for the reactor pressure vessel, if desired. The base 220, which is preferably of concrete, supports the pressure vessel 10 on its pedestal support 15, and flanges 17 thereof may be anchored to the base 220, if desired. Structural steel channels 22 forming the housing 45 extend along the base 220 resting thereon to form a portion of the support. After the pressure vessel is erected, the electric and water connections are made. The electric connections are not shown, but the water connections are made to valve 237 in pipe 236 and to the heat exchanger pipes 243 and 244. The sections of standard open steel grating 196 are inserted so as to rest upon the shoulder 104 of the core tank 100 and the angle iron flange 195 at the periphery of the pressure vessel 10.

The graphite columns can then be installed and secured in place.

Operation

The operation of the installed reactor package can best be understood by reference to FIG. 10. The first step in the process of starting the reactor would be to fill the pressure tank 10 to the proper level to the bottom of inlet pipe 230 and also the core tank 100. This is accomplished by opening the valve 237 to the water main, and valves 232 to the pressure vessel 10. This supplies demineralized water from the ion exchanger into the pressure vessel. After the unit has been filled with demineralized water in the manner above stated, it is ready for fuel loading. At the end of the filling operation, all valves are closed so as to maintain the water levels fixed. The cover assembly including the rotary regulator 145, the sample tube 131, the cover 140 and the fuel elements FA secured in place by sleeve 133 and fitting 124 are then lowered into place, and the flange joint at the top of the core tank is assembled in the manner heretofore described. Manual fill valve 224 and core tank level indicator valve 251 are opened so as to establish the water level in the core tank and to drain the scram line 221, once this operation is completed these valves are closed and remain closed. The overflow valve 258 is opened to assure maintenance of a scram space in the sump 112 of the core tank at all times. For safety's sake, it may be desirable to place an absorber rod within the exposure or sample tube 131 during this operation of installing the fuel assemblies. If so, the absorber rod is then removed from the tube, the shield plug installed with its access tube and the unit is now ready for operation. The control valve 232 is open and the pump 238 started. Core coolant control valve 248 is also opened. The control valve 232 is then gradually closed which will force the pressure from the head of the pump down the line 229 to the nozzles 165, etc., raising the rotary regulator 145, as shown in FIG. 10, and causing it to spin. The amount of closing of the valve 232 will regulate the position of the rotary regulator 145. The more the valve 232 is closed, the more the rotary regulator will be withdrawn from the core and vice versa. Thus, the rotary regulator 145 can be operated exactly like a shim or a regulating rod. The rotary regulating valve 232 is then closed gradually until the unit reaches the desired power level, at which time the unit is switched to automatic control which takes over the regulation of valve 232, pump 238 and control valve 248 as well as the solenoid operated scram valves 222 and 223.

Shut down or scram is achieved by any one of the following events occurring by manual or instrument control, for example, closure of the control valve 248 which would cause generation of steam in the fuel assemblies automatically creating voids to lower the reaction below critical. If valve 232 is opened wide, this would also shut down the reactor because the regulator would drop into the core. Opening of the scram valves 222, 223 or the manual fill valve 224 would automatically dump the water from the core tank into the sump 112 creating a void and shutting down the reactor. Opening of the emergency dump valve 255 would drop the water level below the end of the pipe 103 in the core tank 100 so that the coolant drains rapidly out of the core. Obviously, also pump stoppage or electrical failure would produce a movement of the regulator into the core to lower the reactivity level and shut the reactor down. There are other safety features that are inherent in the design of the (AAR) constructed according to this disclosure. One is the fact that the fuel assembly design provides for rapid expulsion of the moderator upon a surge of power and formation of steam. Each fuel assembly would then provide a reservoir of moderator for decay heat removal upon scram or shut down. Another safety feature of the design is the fact that there are two barriers against the release of fission products, the fuel cladding about each of the fuel elements in the fuel assembly and the core tank itself. It is also possible to provide seals on the shield plug 263 and the rotary shield plug 265, if desired, thereby making the pressure vessel 10 a containment vessel.

The mass and reactivity requirements show that the U–235 content in the core should be approximately 2 kg. The mass coefficient of reactivity appears to be low. A burnup of 10 grams of U–235 would be adequate to operate 6 hours per day, 5 days per week for 10 years and would require less than 0.01 percent reactivity control. Water temperature can readily be maintained at 100 degrees Fahrenheit or less so that the reactivity requirement for temperature should be no greater than 0.05 percent. It is difficult to estimate the exact reactivity requirements for the samples to be irradiated, but indications are that the total excess reactivity can be maintained less than that which would cause a prompt critical situation. Thus, the total excess reactivity might be 0.6 percent which would leave approximately 0.4 percent for the samples to be irradiated. With such a small amount of excess reactivity only a small amount of void need be formed in the fuel assemblies to completely override the excess and core power will drop quickly to about 500 watts in the first few minutes and to a few watts after approximately an hour from the designed reactor power of 10 kw. It is also calculated that the thermal neutron flux distribution through the horizontal reactor center line of the test region is approximately $10^{12}$N–cm.$^2$/sec. at a reactor power of 10 kw. The average flux in the core will be 1.2 times $10^{11}$N–cm.$^2$/sec. and the maximum-to-average thermal neutron flux ratio with this construction is approximately 2.3. The axial maximum-average flux distribution figures ought to be not less than 1.2. Thus, the neutron flux distribution in the axial direction is relatively flat which is desirable for irradiation purposes, the approximate peaking factor for the thermal flux is approximately 6.5 from the average in the core to the center of the test region. Calculations on a similar reactor indicate that a 1 inch diameter cobalt rod inserted in the trap the full length of the reactor is worth about 0.7 percent in reactivity. It is, therefore, expected that a relatively strong poison could be inserted in the test region without shutting down the reactor.

Changes in and modifications of the construction described may be made without departing from the spirit of my invention or sacrificing any of its advantages.

Having thus described the invention, what is claimed and desired to be secured by Letters Patent is:

1. A nuclear reactor adapted for activation analysis purposes comprising a main pressure vessel, a core formed of a plurality of nuclear fuel bearing assemblies supported in said main pressure vessel, a system connected with said pressure vessel for circulating a fluid moderator in a path of flow at different rates through said reactor, a regulator means movable toward and away from said core for controlling the reactivity level in said core and located in the path of flow of the moderator in said pressure vessel and means to position the regulator means toward and away from the core in response to changes in flow rate of moderator in the path of flow through said pressure vessel.

2. A nuclear reactor adapted for activation analysis purposes comprising a main pressure vessel, a core tank within said main pressure vessel and supported therein in an upright position, a core formed of a plurality of nuclear fuel bearing assemblies enclosed in said core tank, a system connected with said pressure vessel for circulating a fluid moderator through said reactor, a regulator means located in the path of flow of fluid through said reactor, submerged in the moderator and having a displacement to weight ratio to obtain a slight negative buoyancy and movable toward and away from said core for controlling the reactivity level in said core and means to position the regulator means with respect to the core in response to the flow rate of moderator in the path of flow through said reactor in a direction to counteract the effect of negative buoyancy.

3. A nuclear reactor adapted for activation analysis purposes comprising a main pressure vessel, a core tank within said main pressure vessel and supported therein in an upright position, a core formed of a plurality of nuclear fuel bearing assemblies enclosed in said core tank, a system connected with said pressure vessel for circulating a fluid moderator through said reactor, a regulator means located in the path of flow of fluid through said reactor, submerged in the fluid moderator an amount to produce a displacement to weight ratio to obtain a slight negative buoyancy and movable toward and away from said core to control the reactivity level in said core and means to position the regulator means with respect to the core in response to a controlled rate of flow of moderator in the path of flow of fluid through said reactor in a direction to counteract the effect of negative buoyancy for any given position of said regulator means.

4. A nuclear reactor adapted for activation analysis purposes comprising a main pressure vessel, a core tank within said main pressure vessel and supported therein in an upright position, a core formed of a plurality of nuclear fuel bearing assemblies enclosed in said core tank, a system connected with said pressure vessel for circulating a fluid moderator through said reactor, a regulator means located in the path of flow of fluid through said reactor, submerged in the fluid moderator an amount to obtain a displacement to weight ratio which gives a slight negative buoyancy and movable toward said core to regulate the reactivity level in said core, and means to position and to stabilize the regulator means with respect to the core in response to a change in rate of flow of moderator in the path of flow through said reactor.

5. A nuclear reactor adapted for activation analysis purposes comprising a main pressure vessel, a core tank within said main pressure vessel and supported therein in an upright position, a core formed of a plurality of nuclear fuel bearing assemblies enclosed in said core tank, a system connected with said pressure vessel for circulating a fluid moderator through said reactor, a freely movable regulator means located in the path of flow of fluid through said reactor, submerged in the moderator an amount sufficient to obtain a displacement to weight ratio giving a slight negative buoyancy and movable to control the reactivity level in said core and means to stabilize and position the regulator means with respect to the core including means for directing the flow of moderator from said system in the path of flow and upwardly against a surface of said regulator means in oblique manner to produce rotation as well as support for said regulator means.

6. A nuclear reactor adapted for activation analysis purposes comprising a pressure vessel containing a moderator, a closed core tank mounted in said pressure vessel and submerged in the moderator and containing a plurality of nuclear fuel bearing assemblies in one part thereof and a sump part connected with said one part, a discharge pipe extending from said first part below the moderator level in said sump part, a primary coolant loop with a connection to discharge moderator into said pressure vessel, a secondary coolant loop connected to and pressurized by the head of moderator in said pressure vessel for supplying moderator to said first part of said core tank for maintaining said nuclear fuel assemblies at least partly submerged having a connection for returning the moderator to said primary coolant loop from said sump part, and control valve means located in one of said coolant loops regulating the flow in both said primary and said secondary coolant loops.

7. A combination as defined in claim 6 in which the secondary coolant loop has a connecting line with a valve and an outlet located at the same level as the top of said core tank for indicating moderator level in said first part of said core tank.

8. The combination as defined in claim 6 in which said sump part has an overflow stand pipe determining moderator level in said sump part.

9. A nuclear reactor adapted for activation analysis purposes comprising a pressure vessel containing a moderator, a core tank mounted in said pressure vessel submerged in the moderator and containing a plurality of nuclear fuel bearing assemblies, a plurality of nozzles supported adjacent the upper portion of said core tank and directed upwardly at an angle to the vertical, a source of fluid pressure connected to supply said nozzles so as to produce an upward directed swirling fluid motion above said upward and angularly directed nozzles, a regulator means having a negative buoyancy mounting a strong absorber of neutrons projecting in the direction of said plurality of nuclear fuel bearing assemblies and a surface on said regulator means disposed above said nozzles and acted on by the upward swirling fluid motion to suspend said regulator means in a given position in the moderator with respect to said nozzles and said absorber in a given position with respect to said nuclear fuel bearing assemblies and produce rotation of said regulator means and thereby a gyroscopic stabilizing effect.

10. A nuclear reactor adapted for activation analysis purposes comprising a pressure vessel containing a moderator, a core tank mounted in said pressure vessel submerged in the moderator and containing a plurality of nuclear fuel bearing assemblies, a plurality of nozzles supported adjacent the upper portion of said core tank and directed upwardly at an angle to the vertical, a cooling loop for the moderator including a plurality of connected lines with an interconnected pump for producing a circulation of moderator to and from said pressure vessel, a pair of branch inlets from said coolant loop one of which discharges to said pressure vessel and the other of which is a source of fluid pressure connected to supply said nozzles so as to produce an upward directed swirling fluid motion above said upward and angularly directed nozzles, a regulator means having a negative buoyancy mounting a strong absorber of neutrons projecting in the direction of said plurality of nuclear fuel bearing assemblies, a surface on said regulator means disposed above said nozzles and acted on by the upward swirling fluid motion to suspend said regulator means in a given position in the moderator with respect to said nozzles and with respect to said nuclear fuel bearing assemblies and produce rotation thereof and thereby a gyroscopic stabilizing effect, and a control valve in the branch discharging to said pressure vessel for indirectly controlling the position of said regulator means.

11. A nuclear reactor adapted for activation analysis purposes comprising a pressure vessel, an apertured head closing the lower end of said vessel, a core tank having a lower cylindrical sump part, a flange secured around said sump part adapted to close the aperture in said head and secured thereto, an upper cylindrical part for said core tank within said pressure vessel having spaced concentric walls forming an inner supply passage and an outer return passage for the flow of moderator, a plurality of spool-like fuel assemblies having cylindrical hubs and attached circular flanges supported in stacked relation in said upper cylindrical part of said core tank with the cylindrical hubs forming a continuation of said inner supply passage and generally radially extending passages in said fuel assemblies interconnecting said supply passage and said return passage.

12. The combination as defined in claim 11 in which said cylindrical hubs are apertured to permit flow from said inner supply passage to said outer return passage through the passages in said fuel assemblies.

13. The combination as defined in claim 11 in which said cylindrical hubs are apertured to permit flow from said inner supply passage to said outer return passage through the passages in said fuel assemblies, and the said passages are formed by said apertures and a plurality of spaced spirally arranged plates bearing nuclear fuel supported by the flanges of said spools.

14. A spool-like fuel assembly for a nuclear reactor comprising a cylindrical hub, circular flanges secured in spaced axial relationship on said cylindrical hub and a plurality of fuel elements in the form of plates of spiral configuration held at their edges between opposed faces of said spacer flanges to form spiral fluid passages, fluid inlet passages in said cylindrical hub communicating with the space between said flanges to admit a flow of moderator to the spiral paths formed between said fuel element plates and a cylindrical weir extending from the periphery of the lower flange upwardly adjacent the outlet of the spiral fluid passages between said fuel elements for maintaining a substantial portion of said fuel elements submerged in fluid during flow of fluid from said inlet passages over said cylindrical weir.

15. The combination as defined in claim 14 in which said fluid inlet passages are located above the level of the upper cylindrical edge of said cylindrical weir so as to trap some fluid after circulation has stopped.

16. A spool-like fuel assembly for a nuclear reactor comprising a tubular hub, a pair of flanges with relatively flat faces in spaced axial relation on said hub, and a plurality of fuel elements in the form of plates of spiral configuration held at their upper and lower edges between opposed faces of said flanges, a plurality of similar spaced spiral guides formed in the opposed flat faces of said flanges for holding the edges of said fuel element spiral plates in spaced relation, means securing said flanges in place on said tubular hub with said spiral guides gripping the edges of the spiral plates of said fuel elements and a tubular flange fitted about the outer periphery of one of said pair of flanges and projecting beyond said one of said pair of flanges in an axial direction to at least partially enclose said fuel elements and in an axial direction to act as a locating means for said fuel assembly.

17. A spool-like fuel assembly for a nuclear reactor comprising a plurality of fuel elements in the form of plates coiled into similar spiral configuration in nested relation one with another, with their adjacent edges on opposite sides of said plates in spaced apart relation, a plate spacer of complementary configuration to the adjacent edges on one side of said fuel elements, a plurality of similarly spaced spiral guides formed in one face of said spacer for holding the edges of said fuel element spiral plates in uniform spaced relation, means for securing said spacer in place with said spaced spiral guides gripping the edges of the spiral plates of the fuel elements, thereby providing radial-axial uniform flow paths between the fuel elements.

18. A spool-like fuel assembly for a nuclear reactor comprising a plurality of fuel elements in the form of plates coiled into similar spiral configuration in nested relation one with another and with the adjacent edges on opposite sides of said plates in spaced apart relation, a pair of plate spacers in complementary configuration to the adjacent edges on either side of said fuel assemblies, a plurality of similarly spaced spiral guides formed in one face of each of said spacers for holding the edges of said fuel element spiral plates in uniform spaced relation, and means for securing said spacers in place with said spaced spiral guides gripping opposite edges of the spiral plates of the fuel elements thereby providing radial-axial uniform flow paths between the fuel plates of the fuel assembly.

19. A spool-like fuel assembly for a nuclear reactor comprising a plurality of fuel elements in the form of plates coiled into similar spiral configuration and nested one with another with the adjacent edges on opposite sides of said plates in spaced apart relation, a pair of plate spacers of complementary configuration to the adjacent edges on either side of said fuel elements, a plurality of similar spaced spiral guides formed in one face of each of said plate spacers for holding the edges of said fuel element spiral plates in uniform spaced relation, a tubular extension connected with one of said plate spacers at the periphery thereof, and means for securing said plate spacers in place with said spaced spiral guides gripping the edges of the spiral plates of the fuel elements thereby providing for axial uniform flow paths between said plate elements.

20. A spool-like fuel assembly for a nuclear reactor comprising a plurality of fuel elements in the form of plates coiled into similar spiral configuration and arranged in nested relation one with another with their adjacent edges on opposite sides of said plates in spaced apart relation, a pair of plate spacers of complementary configuration to the adjacent edges on either side of said fuel elements, a tubular extension between said plate spacers apertured for fluid flow, a plurality of similarly spaced spiral guides formed in one face of each of said plate spacers for holding the edges of said fuel element spacer plates in uniform spaced relation, means for securing said spacer plates in place with said spaced spiral guides gripping the edges of the spiral plates of the fuel elements, thereby providing radial-axial uniform flow paths between the fuel elements.

21. A nuclear reactor comprising a container for a fluid moderator, a core of fuel assemblies in said container adapted to be submerged in the fluid and containing nuclear fuel, a regulator means located in the fluid moderator having a neutron absorber movable toward and away from said core for controlling the reactivity level therein, and a means for moving said regulator means by a fluid current created by movement of the fluid moderator.

22. A nuclear reactor comprising a container for a fluid moderator, a core in said container including at least one fuel element in the form of a plate coiled into an open spiral configuration, means to circulate the fluid moderator over said plate in a spiral path defined by said spiral plate a regulator means having a neutron absorber movable toward and away from said core for controlling the reactivity level therein and a means for moving said regulator means.

23. A nuclear reactor adapted for activation analysis purposes comprising a pressure vessel containing a moderator, a closed core tank mounted in said pressure vessel submerged in the moderator and containing a plurality of nuclear fuel bearing assemblies disposed in a first part to form vertical passage means and a sump part below said first part, an outlet connection with one of said vertical passage means extending from said first part into said sump part, means to provide an air chamber in said sump part arranged with respect to said outlet connection to prevent flow from said air chamber through said outlet connection back to said first part, a primary coolant loop connected to discharge moderator into said pressure vessel, a secondary coolant loop pressurized by the head of moderator in said pressure vessel for supplying moderator to other of said vertical passage means in said first part of said closed core tank for maintaining said nuclear fuel assemblies at least partially submerged and a connection between said parts of said core tank for returning the moderator to said pressure vessel from said sump part, means including a normally closed scram line connected to said first part of said core tank for maintaining the air chamber in said sump part and means to vent said scram line to atmosphere to discharge the moderator in said first part of said core tank to said sump part.

24. The combination defined in claim 23 in which said outlet connection between said first part and said sump part of said core tank is a discharge line extending below the moderator fluid level in said sump part.

25. The combination as defined in claim 23 in which said secondary coolant loop has a single control valve means regulating the flow in both said primary and said secondary coolant loops.

26. The combination as defined in claim 23 in which said secondary coolant loop has an emergency dump valve to empty said sump part.

References Cited by the Examiner

UNITED STATES PATENTS

| | | | |
|---|---|---|---|
| 2,857,324 | 10/1958 | Boisblanc et al. | 204—154.3 |
| 2,861,033 | 11/1958 | Treshow | 204—154.3 |
| 2,874,109 | 2/1959 | Cooper | 204—154.3 |
| 2,937,984 | 5/1960 | Chapellier | 204—193.3 |
| 2,968,601 | 1/1961 | Evans | 204—154.2 |
| 2,985,576 | 5/1961 | Hollings | 204—154.2 |
| 3,140,980 | 7/1964 | Breazeale et al. | 176—17 |
| 3,238,107 | 3/1966 | Leyse et al. | 176—18 |

FOREIGN PATENTS 792,972  4/1958  Great Britain.

L. DEWAYNE RUTLEDGE, *Primary Examiner.*

ROBERT L. CAMPBELL, REUBEN EPSTEIN, CARL D. QUARFORTH, *Examiners.*

J. F. DAVIS, M. R. DINNIN, H. E. BEHREND,
*Assistant Examiners.*